Aug. 15, 1939.  G. F. HOFFERBERTH ET AL  2,169,419
REFRIGERATING APPARATUS
Filed April 24, 1937   6 Sheets-Sheet 1

Fig. 1

INVENTORS.
GEORGE F. HOFFERBERTH
AND
BY WILFORD H. TEETER.

Spencer, Hardman and Fehr.
THEIR ATTORNEYS.

Aug. 15, 1939.  G. F. HOFFERBERTH ET AL  2,169,419

REFRIGERATING APPARATUS

Filed April 24, 1937  6 Sheets-Sheet 4

INVENTORS.
GEORGE F. HOFFERBERTH
AND
BY WILFORD H. TEETER.

THEIR ATTORNEYS.

Aug. 15, 1939.  G. F. HOFFERBERTH ET AL  2,169,419
REFRIGERATING APPARATUS
Filed April 24, 1937   6 Sheets-Sheet 6

INVENTORS.
GEORGE F. HOFFERBERTH
AND
BY  WILFORD H. TEETER.

THEIR ATTORNEYS.

Patented Aug. 15, 1939

2,169,419

UNITED STATES PATENT OFFICE 2,169,419

REFRIGERATING APPARATUS

George F. Hofferberth and Wilford H. Teeter, Dayton, Ohio, assignors to General Motors Corporation, Dayton, Ohio, a corporation of Delaware Application April 24, 1937, Serial No. 138,800

10 Claims. (Cl. 62—116)

This invention relates to refrigeration and particularly to refrigerating apparatus of the household type.

An object of the present invention is to provide an improved refrigerating apparatus and a novel method of removably installing a closed refrigerating system therein.

Another object of the invention is to provide a refrigerating apparatus with a substantially frameless cabinet which is light in weight, strong and durable and capable of being manufactured at reduced cost.

Another object of the invention is to provide a refrigerating apparatus with an improved cabinet structure constructed so as to have a part thereof receiving and concealing a refrigerant conduit or conduits of a closed refrigerating system removably mounted therein.

A further object of the invention is to provide a refrigerator construction wherein the metal liner forming walls of a food storage compartment therein is directly supported from a metal structure forming the exterior walls thereof in an improved manner to prevent transference of heat therebetween.

In carrying out the foregoing objects it is a still further object of the invention to provide a more efficient refrigerating apparatus by eliminating bulky wood frames from the cabinet thereof particularly about the food compartment access door opening and to extend insulating material which surrounds the food compartment continuously across the door opening to the front wall of the cabinet to thereby more effectively insulate the cabinet front portion and to prevent the transference of heat into the food compartment in the vicinity of the door opening.

Further objects and advantages of the present invention will be apparent from the following description, reference being had to the accompanying drawings, wherein a preferred form of the present invention is clearly shown.

Figure 1:
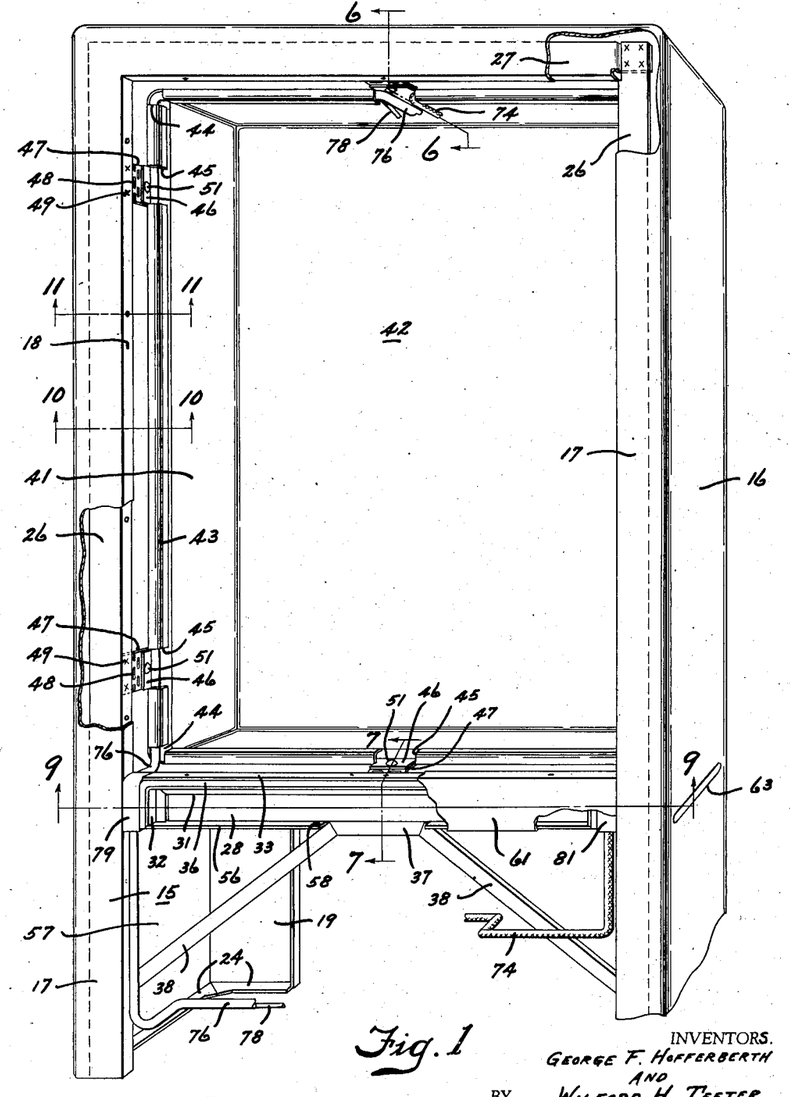
Fig. 1 is a perspective view of the refrigerator cabinet of the refrigerating apparatus of the present invention and shows portions thereof broken away to more clearly illustrate the construction of the cabinet.

Referring to the drawings there is shown in Fig. 1 thereof a refrigerating apparatus of the household refrigerator cabinet type including a closed refrigerating system installed therein and having certain parts of the cabinet and certain elements of the refrigerating system shown in other figures of the drawings omitted therefrom for the sake of clearness in illustrating the present invention.

Figure 3:
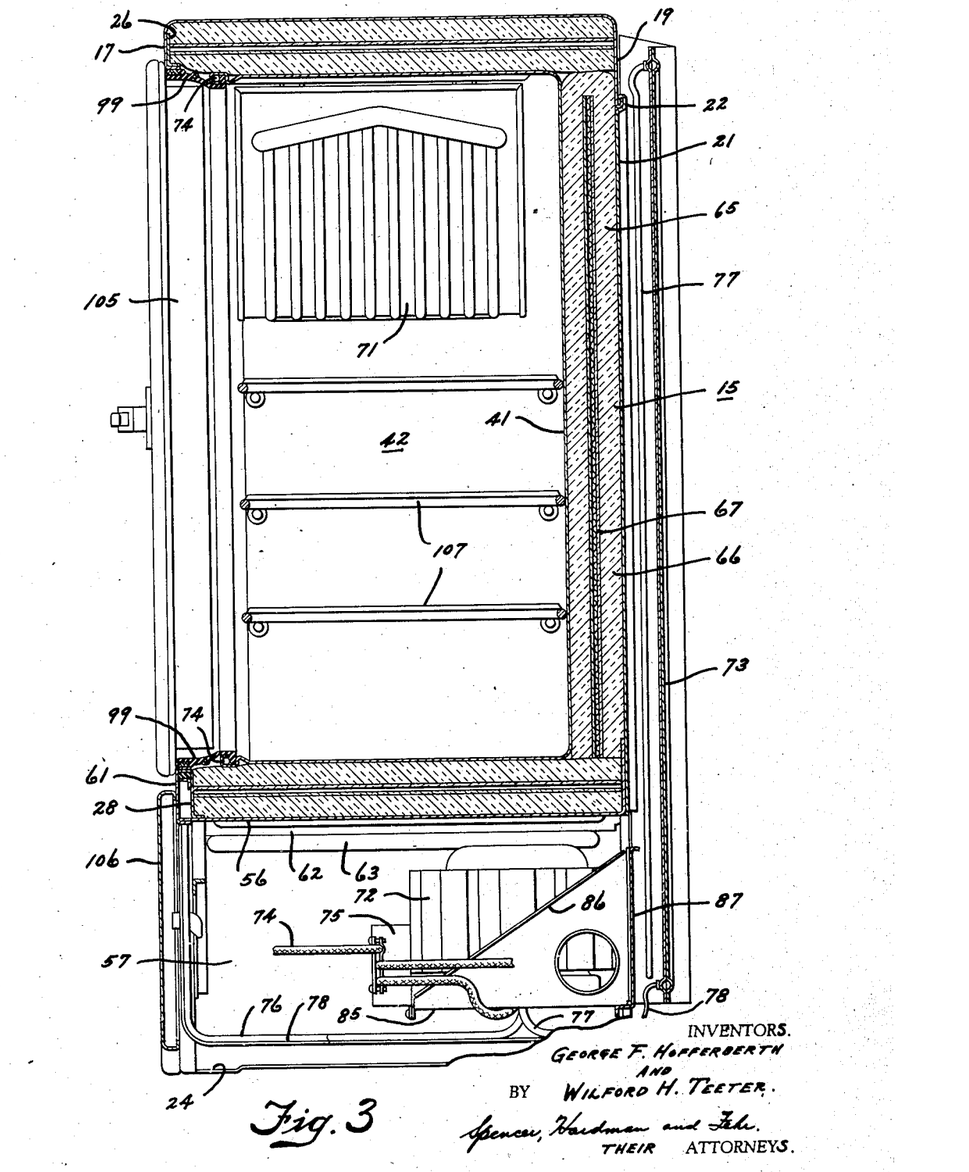
Fig. 3 is a vertical sectional view of the refrigerating apparatus disclosed in Fig. 2 and is taken on the line 2—2 thereof.
Figure 4:
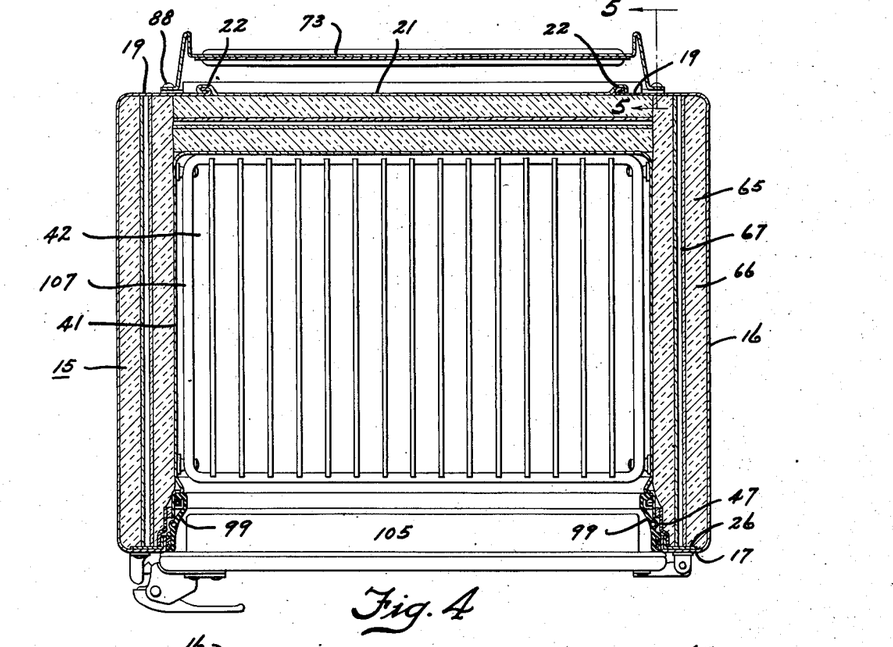
Fig. 4 is a horizontal sectional view of the refrigerator cabinet taken on the line 4—4 of Fig. 2.

The refrigerator cabinet generally represented by the reference character 15 comprises an outer finished wall which is formed from sheet metal blanks. One sheet metal blank 16 is bent into a substantially U-shape to provide the two outer side walls and the top wall of the cabinet 15. This blank 16 has its front edge rolled or bent over as at 17 to form a narrow outer front wall portion of the cambinet 15 and is then bent inwardly to form a flange 18. The portions 17 of blank 16 adjacent the connecting portions thereof at the upper corners of the cabinet are cut out to permit bending of the blank into the U-shaped form and these cut-out portions are then welded together to form continuous front wall cabinet portions. The back edge of blank 16 is also rolled or bent over as at 19 (see Fig. 4) and extends inwardly from the rear upright corners of the cabinet 15. A back sheet metal plate 21 (see Figs. 3 and 4) has its edges rolled over the edges of the inwardly extended portions 19 of blank 16 and welded thereto to provide locked joints, or seams 22 at the back of the cabinet. The ends of the legs of the U-shaped outer metal wall may be bent inwardly as at 24 to form a supporting flange at the bottom of the cabinet.

Figure 7:
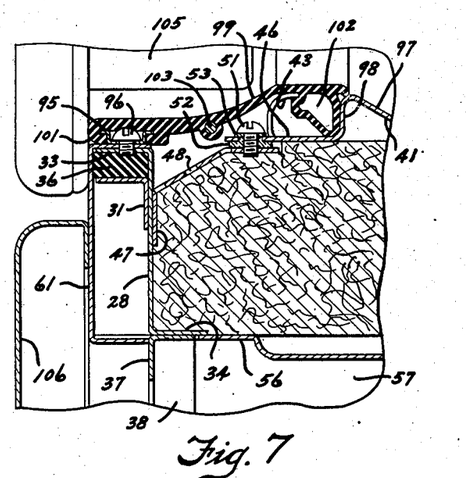
Fig. 7 is an enlarged sectional view of a portion of the refrigerating apparatus taken on the line 7—7 of Fig. 1 showing the support of the cabinet liner.
Figure 8:
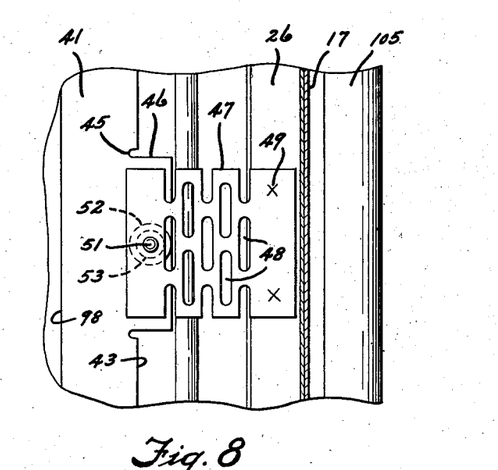
Fig. 8 is a fragmentary enlarged view of a portion of the refrigerator cabinet disclosed in Fig. 1 and further showing the support of the cabinet liner from the cabinet outer wall structure.
Figure 9:
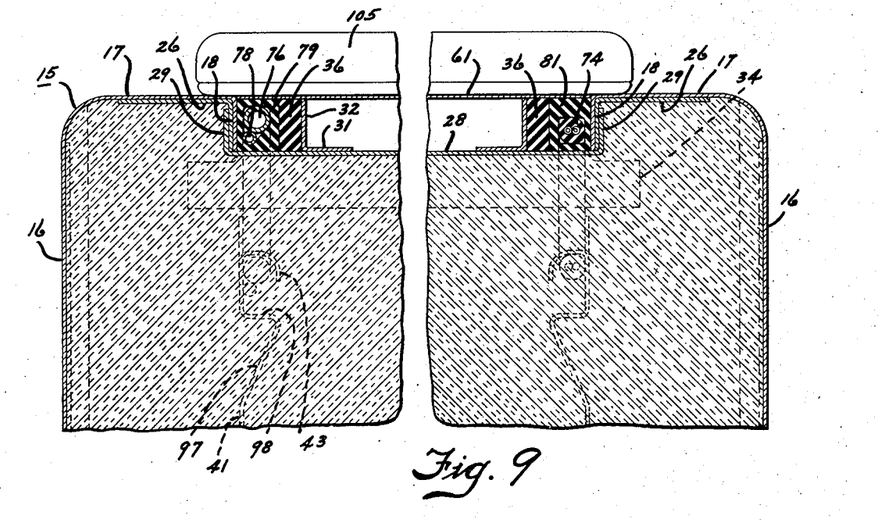
Fig. 9 is an enlarged fragmentary sectional view of a portion of the refrigerating apparatus and is taken on the line 9—9 of Fig. 1.

After the sheet metal blank 16 has been formed and constructed in the manner described a unitary reinforcing upright member is assembled into the U-shaped blank to form a rigid metal outer wall structure for cabinet 15. This unitary reinforcing member comprises two upright L-shaped metal pieces 26 (see Fig. 1) connected together at the top thereof by a horizontally extended L-shaped metal piece 27 welded thereto. The lower portions of the upright L-shaped metal pieces 26 are secured together in spaced relation by a sheet metal cross piece 28 (see Figs. 1, 7 and 9) which has end flanges 29 (see Fig. 9) welded to the pieces 26. The cross piece 28 has an L-shaped sheet metal member 31 welded thereto and having its ends 32 (see Figs. 1 and 9) spaced from the flange 18 on the front portion 17 of blank 16. Cross piece 28 has its top edge bent over as at 33 (see Figs. 1 and 7) to provide an outwardly directed flange and has its bottom edge bent over as at 34 to provide an inwardly directed flange. A resilient rubber-like filler member 36 is located between the L-shaped sheet metal member 31 and the bent over flange 33 of cross piece 28. An L-shaped in cross section bracing member 37 (see Fig. 1) has a horizontal portion thereof secured to the inwardly bent flange 34 on cross piece 28 and has leg portions 38 disposed at an angle and welded or otherwise suitably secured to the lowermost portion of the upright metal pieces 26 of the reinforcing member.

Figure 6:
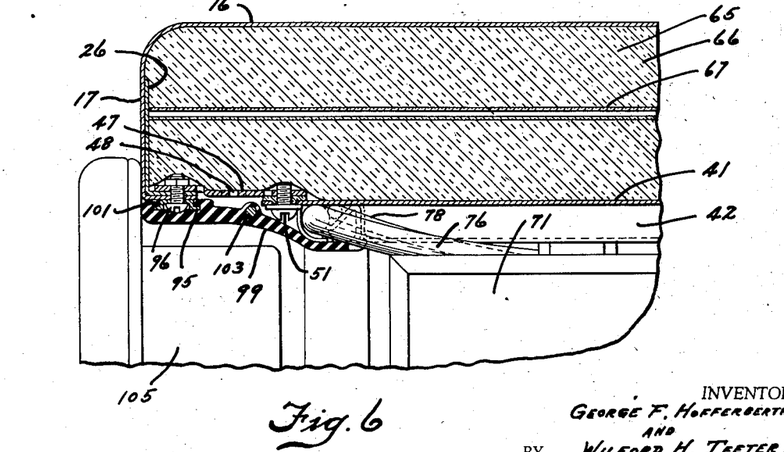
Fig. 6 is an enlarged sectional view of a portion of the refrigerating apparatus and is taken on the line 6—6 of Fig. 1.

A one-piece metal liner 41 forming walls of a food storage compartment 42 within the cabinet 15 has its edges adjacent an opening therein rolled or bent inwardly as at 43 for a purpose to be hereinafter described. Portions of the inwardly bent edge 43 at the corners of the liner 41 are cut out as at 44 and the lower cut-out corners 44 serve a purpose to be presently described. Other portions of the rolled over edge 43 of liner 41 are cut as at 45 to provide spaced apart portions 46 which extend outwardly from the front edge of liner 41 for attachment to the rigid outer metal wall structure of cabinet 15. In order to attach and support liner 41 from the cabinet outer metal walls there is provided adjacent the outwardly extending portions 46 thereof metal pieces 47 which are perforated as at 48 and which are welded as at 49 or otherwise suitably secured to the inwardly directed portions of the L-shaped metal pieces 26 and 27 and to the lower cross piece 28. The metal pieces 47 are each provided with a thread opening which registers with an opening provided in each of the outwardly directed portions 46 of liner 41 to receive a screw 51 (see Figs. 1, 6 and 7). A bushing 52 of insulating material is placed between the portions 46 of liner 41 and pieces 47 and an insulating washer 53 is interposed under the heads of screws 51 to break the metal-to-metal contact between the food compartment liner 41 and the pieces 47 of the supporting structure.

Prior to assembling the food storage wall-forming liner 41 into cabinet 15 a horizontally extending metal plate 56 is placed in the cabinet to form the top wall of a machine compartment 57 provided in the bottom of the cabinet. Plate 56 has its front edge cut back as at 58 (see Fig. 1) to clear the L-shaped portion 37 and to permit the other portions of its front edge to extend outwardly from the cross piece 28 to thereby form a backing for the front panel 61 of the cabinet outer walls (see Fig. 3). The plate 56 has depending side edges 62 (see Figs. 2 and 3) which rest upon indentations 63 provided in the side walls of the cabinet outer wall blank 16. After plate 56 has been assembled into cabinet 15 a plurality of slabs of insulation 65 are placed in abutting relation to the cabinet metal outer walls. These insulating slabs may be of any suitable or desirable material and as herein disclosed comprise glass wool 66 surrounding a heavy piece of corrugated shipping board or paper 67 employed in the slabs to prevent settling of the glass wool and to increase the structural strength of the slabs 65 to thereby facilitate handling thereof. It is to be noted that the insulating slabs 65 extend continuously from the rear wall to the front wall of cabinet 15 and that this insulating material thereby overlaps and surrounds the food compartment door opening. The food compartment liner 41 is placed in cabinet 15 after the insulating slabs 65 have been located therein and the liner is then secured to the cabinet outer metal wall structure by the screws 51. A closed refrigerating system may now be installed in the refrigerator cabinet 15.

Figure 10:
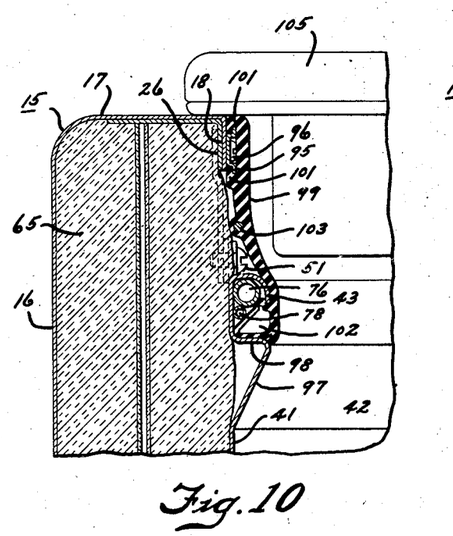
Fig. 10 is an enlarged fragmentary sectional view of a portion of the refrigerator cabinet taken on the line 10—10 of Fig. 1.
Figure 11:
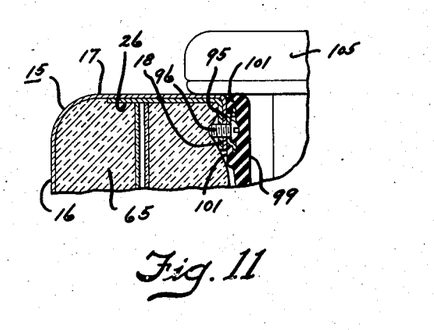
Fig. 11 is a fragmentary sectional view of a part of the refrigerator cabinet and is taken on the line 11—11 of Fig. 1.

The refrigerating system in the present disclosure comprises an evaporator 71, a refrigerant compressing and circulating unit 72 and a condenser 73 all connected together by suitable conduits to form a closed refrigerant circulating system. The refrigerating system also comprises a switch (not shown) carried by the evaporator 71 and operatively connected by an electrical conduit 74 to a control device 75 carried on the unit 72. The switch energizes control device 75 to cause operation of the refrigerant compressing and circulating unit 72 in response to temperatures existing within the food compartment of the refrigerating apparatus. Operation of unit 72 causes refrigerant to evaporate in evaporator 71 to thereby cool and cause circulation of air within the food storage compartment 42 of cabinet 15. Unit 72 withdraws evaporated refrigerant from evaporator 71 through the conduit 76 compresses same and forwards the compressed refrigerant under pressure to the condenser 73 through a conduit 77. The compressed refrigerant is cooled and liquefied in condenser 73 and forwarded to evaporator 71 through a conduit 78 for re-evaporation therein. The switch connected by electrical conduit 74 to control device 75 may be adjusted to control operation of unit 72 for maintaining any desired temperature within the food storage compartment 42 of the refrigerating apparatus. It will be noted that the refrigerant conveying conduits 76 and 78 of the closed refrigerating system extend through an open-sided slot or recess at a side of the front wall of cabinet 15 and which recess is provided by spacing the end portion 32 of L-shaped sheet metal member 31 from the in-turned flange 18 on blank 16 and member 26 (see Fig. 9). A resilient rubber-like member 79 surrounds the portions of pipes 76 and 78 disposed within the recess and is pressed into position adjacent the rubber filler member 36. These conduits 76 and 78 extend inwardly of the cabinet front wall through the lower cut-out portion 44 of liner 41 at one side of the cabinet. Conduits 76 and 78 are then disposed within the space or groove provided by the in-turned bent over front edge 43 of liner 41 in their extensions from the cabinet dividing wall to the top of the food storage compartment (see Figs. 1 and 10). These conduits are brought out from behind the in-turned bent over front edge 43 of liner 41 through the cut-out portion 45 at the top of the food compartment 42 (see Fig. 6) and are connected at these points to evaporator 71. The electrical conduit 74 extends through a recess provided on the other side of the cabinet front wall beneath finish strip 61 and has a rubber member 81 surrounding same and pressed in position adjacent the rubber filler 36. This electrical conduit 74 extends inwardly of the cabinet front wall through the cut-out portion 44 of liner 41 on the side of the cabinet opposite the refrigerant conduits 76 and 78. Conduit 74 is located within the space provided by the in-turned bent over front edge 43 of liner 41 and this conduit is also brought out from behind the liner bent-over edge at the top of the food storage compartment for connection with the switch (not shown) carried by the evaporator 71. The rolled or bent-over front edge 43 of liner 41 thus conceals refrigerant conduits 76 and 78 and the electrical conduits 74 and serves as a shield to protect same.

Figure 2:
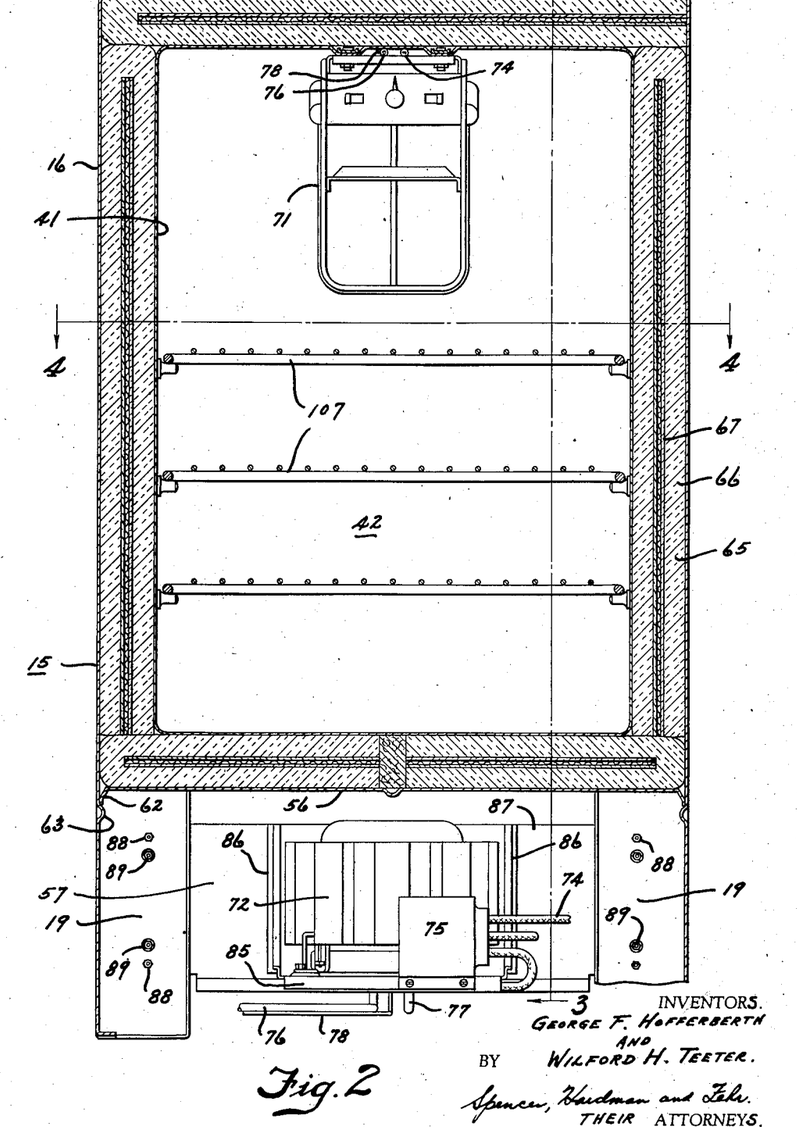
Fig. 2 is a vertical front sectional view of the refrigerator cabinet disclosed in Fig. 1 showing a closed refrigerating system mounted therein.
Figure 5:
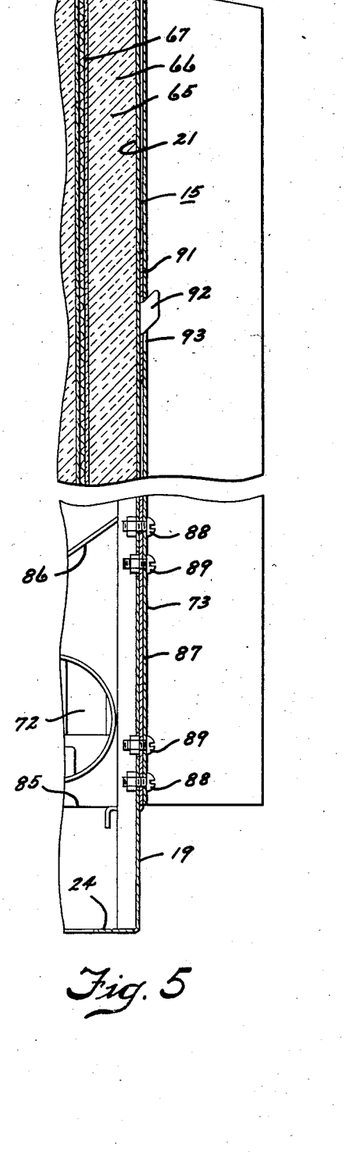
Fig. 5 is a fragmentary vertical sectional view taken on the line 5—5 of Fig. 4 showing the mounting of the condenser of the refrigerating system upon the cabinet.

The refrigerant compressing and circulating unit 72 is carried upon a base 85 supported from a pair of brackets 86 secured in any suitable manner to a vertically disposed metal cross plate 87 (see Figs. 2 and 5). The metal cross plate 87 is secured to the in-turned portion 19 of blank 16 at the rear of cabinet 15 by bolts 88. The bolts 88 also pass through a side of condenser 73 to secure the lower portion of the condenser to the cabinet 15. Bolts 89 pass through a part of condenser 73 and through the metal plate 87 to clamp the condenser to the unit 72 to thereby form a unitary structure. A metal plate 91 secured to the upper portion of the back wall of cabinet 15 in any suitable manner (see Fig. 5) has hook or hanger portions 92 extending outwardly therefrom. Each side portion of condenser 73 has an opening 93 provided therein which fits over and receives the hook or hanger portion 92 of plate 91 to removably hold the upper part of condenser 73 to the cabinet 15. The securing of unit 72 and condenser 73 to one another and to cabinet 15 in the manner described is for a purpose that will become apparent hereinafter.

It is desirable to close the space between the edge of the food compartment liner 41 and the front wall portion of cabinet 15 to provide walls of neat appearance around the food compartment access or door opening. Therefore a metal strip or a plurality of strips 95 having outwardly bent portions and laterally extending flanges are secured by screws 96 (see Figs. 6, 7, 10 and 11) which are threaded into the members 26, 27 and 33, to the cabinet 15 around the door opening thereof. The food compartment liner 41 has a raised portion 97 formed therein inwardly of the bent-over edge portion 43 thereof (see Figs. 7 and 10) and which raised portion provides a bead or the like having a shoulder 98 adjacent the groove provided by the bent-in edge 43 of the liner. A resilient molding member or cover strip generally represented by the reference character 99 and preferably formed of rubber is adapted to span the space between the edge of liner 41 and the outer cabinet wall to form an impervious wall around the cabinet food compartment access door opening. The member 99 is preferably of a rectangular shape one-piece structure and has a groove formed therein, the lips 101 of which are flexed over the laterally extending flanges of strip 95. A hollow bead portion 102 formed on the opposite edge of cover member 99 is forced into the space provided between the inwardly bent-over edge 43 of liner 41 and the shoulder 98 of the bead. The lips 101 of member 99 fitting over the strip or strips 95 and the hollow bead portion 102 thereof secured to the in-turned edge portion 43 of liner 41 normally holds the cover member 99 in place and also conceals refrigerant pipes 76 and 78 and the electrical conduits 74 within the groove provided by the in-turned bent edge 43 of liner 41. The bead 102 on member 99 is preferably of such shape as to hold the refrigerant pipe 76 and 78 in abutting relation with one another and to force these pipes tightly against the metal liner 41. The contact of pipes 76 and 78 with one another forms a heat exchanger therebetween and since the refrigerant suction pipe 76 is ordinarily colder than the air within the compartment 42 it normally condenses moisture thereon. However by placing pipe 76 in thermal contact with liner 41 its temperature is increased to that of the liner and it does not therefore cause condensation of moisture thereon. Sweating of the refrigerant pipe 76 is thereby eliminated thus permitting same to be located within the food storage compartment. A metal member or members such as a wire or the like 103, may be imbedded in the cover member 99 for reinforcing the central portion of this member and to render the walls of the door opening substantially rigid. The cabinet 15 may be provided with an insulated door structure 105 for closing the food compartment access opening and a second door 106 may be provided for closing the front of the machine compartment 57. A plurality of shelves 107 may be supported in any suitable manner one above the other within the food compartment 42 to divide this compartment into a plurality of storage spaces.

It will be seen that the refrigerating apparatus disclosed includes a cabinet having a closed refrigerating system associated therewith and which closed system may be quickly and readily removed from the cabinet as a unit. Assume that the refrigerating apparatus is assembled into cabinet 15 as a unitary device in the manner disclosed and it is desirable or necessary to remove the refrigerating system therefrom. The food compartment access opening wall-forming member 99 is first removed from the cabinet 15 by flexing the lips 101 of the groove fitted over the strips 95 and by prying the hollow bead portion 102 thereof from beneath the inwardly bent edge 43 of liner 41. The strip 95 along the bottom of the door opening is then removed from the cabinet 15 by loosening screws 96 to thereby permit removal of the outer cabinet finished front cross wall part 61. After removal of the cross wall part 61 bolts 88 are removed to thereby free the unit 72 and condenser 73 from cabinet 15. The evaporator 71 is then removed from the food compartment top wall. The refrigerant pipes 76 and 78 together with the electrical conduits 74 extending from the food compartment bottom wall up to the evaporator 71 can now be moved out from beneath the turned over edge 43 of liner 41. The pipes 76 and 78 and conduit 74 together with evaporator 71 is moved outwardly of the food compartment 42 to thereby remove these pipes and this conduit together with the rubber sleeves or members 79 and 81 which surround them from the cabinet 15. By elevating condenser 73 and the unit 72, which are still connected together by bolts 89, the openings 93 in condenser 73 will free the hooks or hangers 92. The cabinet 15 can therefore be moved away from the closed refrigerating system since the refrigerant pipes 76 and 78 and the electrical conduit 74 pass in front of the members 38 in their extension to the unit 72.

From the foregoing it will be seen that there is provided an improved refrigerating apparatus of the household type and that the cabinet thereof is of improved construction. The present invention provides an improved association of a closed refrigerating system with the cabinet of the apparatus and while parts of the refrigerating system are concealed by portions of the cabinet the system can be readily and quickly removed therefrom. All bulky wood framework having been eliminated from the cabinet of the refrigerating apparatus disclosed permits the insulation of the cabinet to be extended across the door opening of the food storage compartment to the cabinet front wall to thereby more effectively insulate the front portion of the cabinet particularly around the door or access opening. By perforating the metal members which support the food compartment liner from the outer cabinet walls there is no appreciable heat transfer from the metal liner to the cabinet metal walls. The improved refrigerating apparatus disclosed provides a strong and durable structure which can be manufactured at low cost.

While the form of embodiment of the invention as herein disclosed, constitutes a preferred form, it is to be understood that other forms might be adopted, all coming within the scope of the claims which follow.

What is claimed is as follows:

1. A refrigerating apparatus comprising in combination, a cabinet including a metal structure forming the exterior walls thereof and having an opening therein, a metal liner forming walls of a food storage compartment within said cabinet and having an opening registering with the opening in said metal structure to provide a door opening for said compartment, a cooling element exposed to air within said compartment, means connected to said cooling element for circulating a cooling medium therethrough to cause same to produce a refrigerating effect, said liner being spaced from said cabinet metal structure at said door opening, insulating material surrounding said liner and extending continuously across the space between said liner and said metal structure to the exterior cabinet wall having the door opening therein, said insulating material preventing the transference of heat from the outside of said cabinet about said door opening into said food storage compartment, means disposed at a plurality of spaced apart points along said door opening for connecting said liner to said cabinet metal structure for supporting same directly therefrom, portions of said liner adjacent the edge thereof at said door opening being rolled over to form an inturned flange, a cover extending over said means for supporting said liner from said cabinet metal structure and closing the space therebetween to form a wall of said door opening, and said cover engaging said cabinet metal structure at said door opening and being removably attached to said inturned flange on said liner.

2. A refrigerating apparatus comprising in combination, a cabinet having a liner forming a plurality of side walls and a back wall of a food storage compartment therein, a door opening in the food storage compartment, a cooling element in said food compartment, means located outside said compartment for circulating a cooling medium through said element, a cooling medium conveying conduit connecting said element to said circulating means, said cooling element, said circulating means and said conduit forming a closed system removably associated with said cabinet, and said liner having a part thereof adjacent its edge at said door opening directed inwardly of one of said compartment side walls toward an opposed side wall thereof and having a continuation of said part extending over a portion of said one compartment side wall and directed toward said compartment back wall to form a groove for removably receiving said conduit.

3. A refrigerating apparatus comprising in combination, a cabinet having a liner forming a plurality of side walls and a back wall of a food storage compartment therein, a door opening in the food storage compartment, a cooling element in said food compartment, means located outside said compartment for circulating a cooling medium through said element, a cooling medium conveying conduit connecting said element to said circulating means, said cooling element, said circulating means and said conduit forming a closed system removably associated with said cabinet, said liner having a part thereof adjacent its edge at said door opening directed inwardly of one of said compartment side walls toward an opposed side wall thereof and having a continuation of said part extending over a portion of said one compartment side wall and directed toward said compartment back wall to form a groove for removably receiving said conduit, and a removable cover for said groove for concealing said conduit and maintaining same in said groove.

4. A refrigerating apparatus comprising in combination, a cabinet having a liner forming a plurality of side walls and a back wall of a food storage compartment therein, a door opening in the food storage compartment, a cooling element in said food compartment, means located outside said compartment for circulating a cooling medium through said element, a cooling medium conveying conduit connecting said element to said circulating means, said cooling element, said circulating means and said conduit forming a closed system removably associated with said cabinet, said liner having a part thereof adjacent its edge at said door opening directed inwardly of one of said compartment side walls toward an opposed side wall thereof and having a continuation of said part extending over a portion of said one compartment side wall and directed toward said compartment back wall to form a groove for removably receiving said conduit, and a removable cover for said groove for concealing said conduit and maintaining same in said groove, said cover having a part thereof extending beyond said groove and forming a wall of said food compartment door opening.

5. A refrigerating apparatus comprising in combination, a cabinet having a liner forming a plurality of side walls and a back wall of a food storage compartment therein, a door opening in the food storage compartment, a cooling element in said food compartment, means located outside said compartment for circulating a cooling medium through said element, a cooling medium conveying conduit connecting said element to said circulating means, said cooling element, said circulating means and said conduit forming a closed system removably associated with said cabinet, said liner having a portion thereof spaced from its edge at said door opening bent inwardly of one of said compartment side walls toward an opposed side wall thereof and thence back toward said one compartment side wall to provide a bead extending along said one compartment side wall, said liner also having a part thereof between its edge at said door opening and said bead directed inwardly of said one compartment side wall toward said opposed side wall thereof, and said bead, said liner part and the connection of said liner therebetween forming walls of a groove for removably receiving said conduit.

6. A refrigerating apparatus comprising in combination, a cabinet having a liner forming a plurality of side walls and a back wall of a food storage compartment therein, a door opening in the food storage compartment, a cooling element in said food compartment, means located outside said compartment for circulating a cooling medium through said element, a cooling medium conveying conduit connecting said element to said circulating means, said cooling element, said circulating means and said conduit forming a closed system removably associated with said cabinet, said liner having a portion thereof spaced from its edge at said door opening bent inwardly of one of said compartment side walls toward an opposed side wall thereof and thence back toward said one compartment side wall to provide a bead extending along said one compartment side wall, said liner also having a part thereof between its edge at said door opening and said bead directed inwardly of said one compartment side wall toward said opposed side wall thereof, said bead, said liner part and the connection of said liner therebetween forming walls of a groove for removably receiving said conduit, and a removable cover for said groove for concealing said conduit and maintaining same in said groove.

7. A refrigerating apparatus comprising in combination, a cabinet having a liner forming a plurality of side walls and a back wall of a food storage compartment therein, a door opening in the food storage compartment, a cooling element in said food compartment, means located outside said compartment for circulating a cooling medium through said element, a cooling medium conveying conduit connecting said element to said circulating means, said cooling element, said circulating means and said conduit forming a closed system removably associated with said cabinet, said liner having a portion thereof spaced from its edge at said door opening bent inwardly of one of said compartment side walls toward an opposed side wall thereof and thence back toward said one compartment side wall to provide a bead extending along one compartment side wall, said liner also having a part thereof between its edge at said door opening and said bead directed inwardly of said one compartment side wall toward said opposed side wall thereof, said bead, said liner part and the connection of said liner therebetween forming walls of a groove for removably receiving said conduit, and a removable cover for said groove for concealing said conduit and maintaining same in said groove, said cover having a part thereof extending beyond said groove and forming a wall of said food compartment door opening.

8. A refrigerating apparatus comprising in combination, a cabinet including a metal structure forming the exterior walls thereof and having an opening therein, a metal liner forming walls of a food storage compartment within said cabinet and having an opening registering with the opening in said metal structure to provide a door opening for said compartment, a cooling element exposed to air within said compartment, means connected to said cooling element for circulating a cooling medium therethrough to cause same to produce a refrigerating effect within said compartment, said liner being spaced a substantial distance from said cabinet metal structure at said door opening, insulating material surrounding said liner and extending continuously across the space between said liner and said metal structure to the exterior cabinet wall having the door opening therein, said insulating material preventing the transference of heat from outside said cabinet about said door opening into said food storage compartment, means disposed at a plurality of spaced apart points around said door opening for connecting said liner to said cabinet metal structure to support the liner directly therefrom, said last named means being relatively flat and extending from said cabinet metal structure to said liner at the point of registration of the openings therein so as not to obstruct the space therebetween adjacent said door opening occupied by said insulating material, and said last named means being insulated from said liner.

9. A refrigerating apparatus comprising in combination, a cabinet including a metal structure forming the exterior walls thereof and having an opening therein, a metal liner forming walls of a food storage compartment within said cabinet and having an opening registering with the opening in said metal structure to provide a door opening for said compartment, a cooling element exposed to air within said compartment, means connected to said cooling element for circulating a cooling medium therethrough to cause same to produce a refrigerating effect within said compartment, said liner being spaced a substantial distance from said cabinet metal structure at said door opening, insulating material surrounding said liner and extending continuously across the space between said liner and said metal structure to the exterior cabinet wall having the door opening therein, said insulating material preventing the transference of heat from outside said cabinet about said door opening into said food storage compartment, means disposed at a plurality of spaced apart points around said door opening for connecting said liner to said cabinet metal structure to support the liner directly therefrom, said last named means being relatively flat and extending from said cabinet metal structure to said liner at the point of registration of the openings therein so as not to obstruct the space therebetween adjacent said door opening occupied by said insulating material, said last named means being insulated from said liner, and a relatively wide cover disposed over and immediately adjacent said last named means for closing the space between said liner and said cabinet metal structure and forming the wall of said door opening.

10. A refrigerating apparatus comprising in combination, a cabinet including a metal structure forming the exterior walls thereof and having an opening therein, a metal liner forming walls of a compartment within said cabinet and having an opening registering with the opening in said metal structure to provide a door opening for said compartment, a closed refrigerating system associated with said apparatus, said refrigerating system including a cooling element within said cabinet for refrigerating said compartment, said refrigerating system also including a cooling medium circulating unit having connections with said cooling element for circulating the cooling medium to and from said cooling element, said liner being spaced a substantial distance from said cabinet metal structure at said door opening, insulating material surrounding said liner and extending therefrom to the exterior cabinet wall having the door opening therein, said insulating material preventing the transference of heat from outside said cabinet about said door opening into said refrigerated compartment, mounting elements associated with said liner and said cabinet metal structure at the point of registration of the openings therein, rigid means disposed at a plurality of spaced apart points around said door opening for connecting said liner to said cabinet metal structure, said rigid means being relatively flat and extending between said cabinet metal structure and said liner adjacent the point of registration of the openings therein, a substantially flat and relatively wide cover disposed over said rigid connecting means for closing the space between said liner and said cabinet metal structure, and said cover forming the walls of said door opening and having resilient edges constructed and arranged to removably engage said mounting elements associated with said liner and said metal structure for securing the door opening wall in place upon the cabinet.

GEORGE F. HOFFERBERTH.
WILFORD H. TEETER.